3,227,625
METHOD OF PRODUCING GLUTAMIC ACID BY FERMENTATION
Urbain A. Phillips, Terre Haute, Ind., assignor to Commercial Solvents Corporation, a corporation of Maryland
No Drawing. Filed Sept. 27, 1963, Ser. No. 311,961
6 Claims. (Cl. 195—30)

The present invention is directed to a method of producing L-glutamic acid and more particularly to a method of producing L-glutamic acid by fermentation of a nutrient fermentation media containing critical amounts of ammonium acetate and an alkali metal acetate with the organism *Brevibacterium divaricatum*.

T. Tsunoda, I. Shio and K. Mitsugi (J. Gen. Appl. Microbiol., vol. 7, No. 1, 1961) have reported that several strains of the genera Brevibacterium grow and accumulate L-glutamate in fermentation media containing ammonium acetate and sodium acetate as the sole carbon source. Also reported are data showing that there are strains of the genus Brevibacterium which do not grow with this acetate fermentation medium. Work with *Brevibacterium flavum* demonstrated that the concentration of the acetate and ammonium ion in the medium were intimately related to the growth and accumulation of L-glutamate. The authors show that for the production of practical yields of L-glutamic acid the total initial acetate, (as acetic acid), ammonium acetate and sodium acetate (each as acetic acid, respectively) should not be above about 60 g./liter, nor below about 35 g./liter and that the maximum yields are obtained with a total initial acetate concentration of approximately 40 to 50 g./liter containing 15 to 20 g. of ammonium acetate. Employment of initial total acetate concentrations of 30 g./liter (10 g./liter of $NH_4$ acetate and 20 g./liter of sodium acetate, each as acetic acid respectively) produced very small yields of glutamic acid.

In accordance with the teachings of the authors of the aforementioned publication, fermentations have been conducted with the organism *Brevibacterium divaricatum* employing the acetate medium of the authors and maximum yields of glutamic acid were obtained in the general area also obtained by the authors, i.e. approximately 20 to 35%, with the strains Brevibacterium they tested, thus confirming in general the results reported in the publication.

In view of the foregoing, it was indeed surprising to discover that with strains of the organism *Brevibacterium divaricatum*, yields of glutamic acid on the order of 70% and better can be obtained in a relatively short fermentation time by employing a fermentation media wherein the total initial acetate concentration is about 20 to 24 or 28 g./liter (an area even below that shown by the authors to produce very small yields) containing about 10 to 12 or 14 g./liter ammonium acetate and about 10 to 12 or 14 g./liter alkali metal acetate (each as acetic acid). These concentrations are important for any deviation either below 10 g./liter or above 14 g./liter of either the ammonium or alkali metal acetate fails to provide significant yields of L-glutamic acid. Optimum results are obtained with an acetate medium containing about 11 g./liter of ammonium acetate and about 11 g./liter of alkali metal acetate. The preferred alkali metals are the 11 to 19 atomic number alkali metals, i.e. sodium and potassium.

In accordance with the process of the present invention, a glutamic acid-producing strain of *Brevibacterium divaricatum* is incubated in an aqueous nutrient medium containing the aforementioned concentrations of ammonium acetate and alkali metal acetate at temperatures preferably between about 28 to 31° C. under submerged conditions of agitation and aeration. The ammonium acetate and alkali metal acetate can serve as the sole carbon source required in the nutrient media although, if desired, other carbon or carbohydrate sources commonly utilized can be employed in addition. In addition to a carbon source, nutrient media utilized require the presence of a nitrogen source in either organic or inorganic form such as urea, ammonium salts such as ammonium chloride, ammonium sulfate and ammonium tartrate. The ammonium acetate utilized in the present invention can also serve to provide the sole source of nitrogen. The media also contain a source of potassium and phosphorus such as dipotassium phosphate; mineral salts such as magnesium sulfate and iron sulfate; a growth requirement material such as biotin, desthiobiotin, and biotin source substances, e.g. peptone, meat extracts, corn steep liquor, casein hydrolyzate, wheat bran extracts yeast extract or mixtures thereof; and preferably growth stimulant materials such as thiamine hydrochloride, folic acid, nicotinic acid, pyridoxal hydrochloride, inositol, Riboflavin, and choline hydrochloride. A particularly preferred nutrient medium is as follows: $NH_4C_2H_3O_2$, 11.0 g; and $NaC_2H_3O_2$, 11.0 g. (as acetic acid, respectively); $KH_2PO_4$, 2.0 g; $MgSO_4 \cdot 7H_2O$, 0.8 g; $MnSO_4 \cdot 2H_2O$, 4 p.p.m.; $FeSO_4 \cdot 7H_2O$, 4 p.p.m.; thiamine HCl, 200μg. (added separately); biotin, 0.25 μg.; and tap water, 1,000 ml.

The media are preferably maintained at a pH ranging from 7 to 9 during the fermentation, preferably by the addition of acetic acid. The fermentation is ordinarily completed within 2 days time when conducted under aeration-agitation conditions.

As previously mentioned, any of the glutamic acid-producing strains of *Brevibacterium divaricatum* can be employed in the process of the present invention. The organisms include *Brevibacterium divaricatum* strains such as NRRL B-2311, NRRL B-2312, NRRL B-2620 which have been deposited with the Northern Regional Research Laboratories of the U.S. Department of Agriculture and described in U.S. Patents 2,978,863 2,978,384 and application Serial No. 140,230 to Fred Arzberger et al. as well as *Brevibacterium divaricatum* Y(+)27 (a single colony isolate of NRRL B-2311). The preferred organism is *Brevibacterium divaricatum* NRRL B-2311.

After preparation of L-glutamic acid by fermentation of the organism *Brevibacterium divaricatum* according to the above-described process, the L-glutamic acid can be recovered by any suitable means. One such means of recovery involves removing the cells from the fermentation medium by filtration or centrifugation, concentrating the resulting filtrate, adjusting the pH of said filtrate to about 3.2 by addition of acid and crystallizing the glutamic acid at reduced temperatures. If a product of a higher grade of purity is desired the concentrated filtrate can first be subjected to ion-exchange resin treatment in order to remove other impurities before crystallization. After adsorption on the ion-exchange resin the L-glutamic acid can then be eluted and again concentrated and crystallized at reduced temperature and recovered by centrifugation.

The following examples are included to further illustrate the present invention.

*Example I*

*Brevibacterium divaricatum* NRRL B-2311 was cultivated for 16 hours at 30° C., at 385 r.p.m. on a rotary shaker, in a seed culture medium of the following composition:

| | |
|---|---|
| Glucose | gms__ 20 |
| $K_2HPO_4$ | gm__ 0.5 |
| $MgSO_4 \cdot 7H_2O$ | gm__ 0.25 |
| BYF-100 (yeast extract) | gm__ 0.5 |
| Urea | gms__ 4.0 |
| Tap water | ml__ 500 |

20 ml. of the following medium were then placed in 500 ml. flasks and the contents thereof sterilized for 15 minutes at 115° C.

| | |
|---|---:|
| $NH_4$ acetate, g. (as acetic acid) | 11 |
| Na acetate, g. (as acetic acid) | 11 |
| $K_2HPO_4$, g. | 2 |
| $MgSO_4 \cdot 7H_2O$, g. | 0.8 |
| Thiamine HCl, µg. | 200 |
| $MnSO_4 \cdot 2H_2O$, p.p.m. | 4 |
| $FeSO_4 \cdot H_2O$, p.p.m. | 4 |
| Biotin, µg. | 0.25 |
| Tap water, ml. | 1,000 |

Each flask was then inoculated with 1.0 ml. seed culture as above described and the flasks were incubated at 30° C. for 48 hours on a rotary shaker at 385 r.p.m. At the end of 8 hours the pH was determined as 9.0 and readjusted to pH 7.0 by addition of a mixture of acetic acid and ammonium acetate composed as follows: $NH_4C_2H_3O_2$, 13.6 gms. (10 gms. as acetic acid); glacial acetic acid, 40 ml.; and distilled water, 100 ml. When the pH was at 9.0 approximately 0.4 ml. of the above solution was required to readjust the pH to 7.0. Usually approximately 1.6 ml. total was used for a normal fermentation (48 hours). At the end of the 48 hours the fermenting medium was found to contain 72.7% L-glutamic acid based on the acetic acid.

*Example II*

Example I was repeated except that 15 g. ammonium acetate and 25 g. sodium acetate (each as acetic acid) were employed. At the end of 48 hours the fermenting medium was found to contain 15% glutamic acid based on the acetic acid.

It is claimed:
1. A process for the production of L-glutamic acid which comprises cultivating an L-glutamic acid-producing strain of *Brevibacterium divaricatum* in an aqueous nutrient medium containing an assimilable nitrogen source and a carbon source of about 10 to 14 g./liter of ammonium acetate and 10 to 14 g./liter of alkali metal acetate (as acetic acid, respectively).
2. The process of claim 1 wherein the organism is *Brevibacterium divaricatum* NRRL B–2311.
3. The process of claim 1 wherein the alkali metal is sodium and the cultivation is conducted at temperatures of about 28 to 31° C. and under submerged conditions of agitation and aeration.
4. The process of claim 3 wherein the concentration of ammonium acetate and sodium acetate is in each case about 11 g./liter as acetic acid.
5. The process of claim 1 wherein the nutrient medium contains growth promoting amounts of biotin.
6. The process of claim 5 wherein the nutrient medium contains growth stimulating amounts of thiamine hydrochloride.

References Cited by the Examiner
UNITED STATES PATENTS
3,117,915   1/1964   Shiio et al. _____ 195—30

OTHER REFERENCES

Shiio et al.: The Journal of Biochemistry (Japan), vol. 46, pages 1665–1666, Dec. 1959.

Tsunoda et al.: Journal General Applied Microbiology (Tokyo), vol. 7, No. 1, pages 18–29 (1961), abst. C.A. 55, 22488 (1961).

A. LOUIS MONACELL, *Primary Examiner.*